Aug. 17, 1965     E. C. WHITEHEAD     3,200,651
METHOD AND APPARATUS FOR DETERMINING THE CONCENTRATION BY
WEIGHT OF A SUBSTANCE IN A FLUID STREAM
Filed Nov. 21, 1961                                2 Sheets-Sheet 1

INVENTOR.
EDWIN C. WHITEHEAD
BY Harry Cohen
ATTORNEY

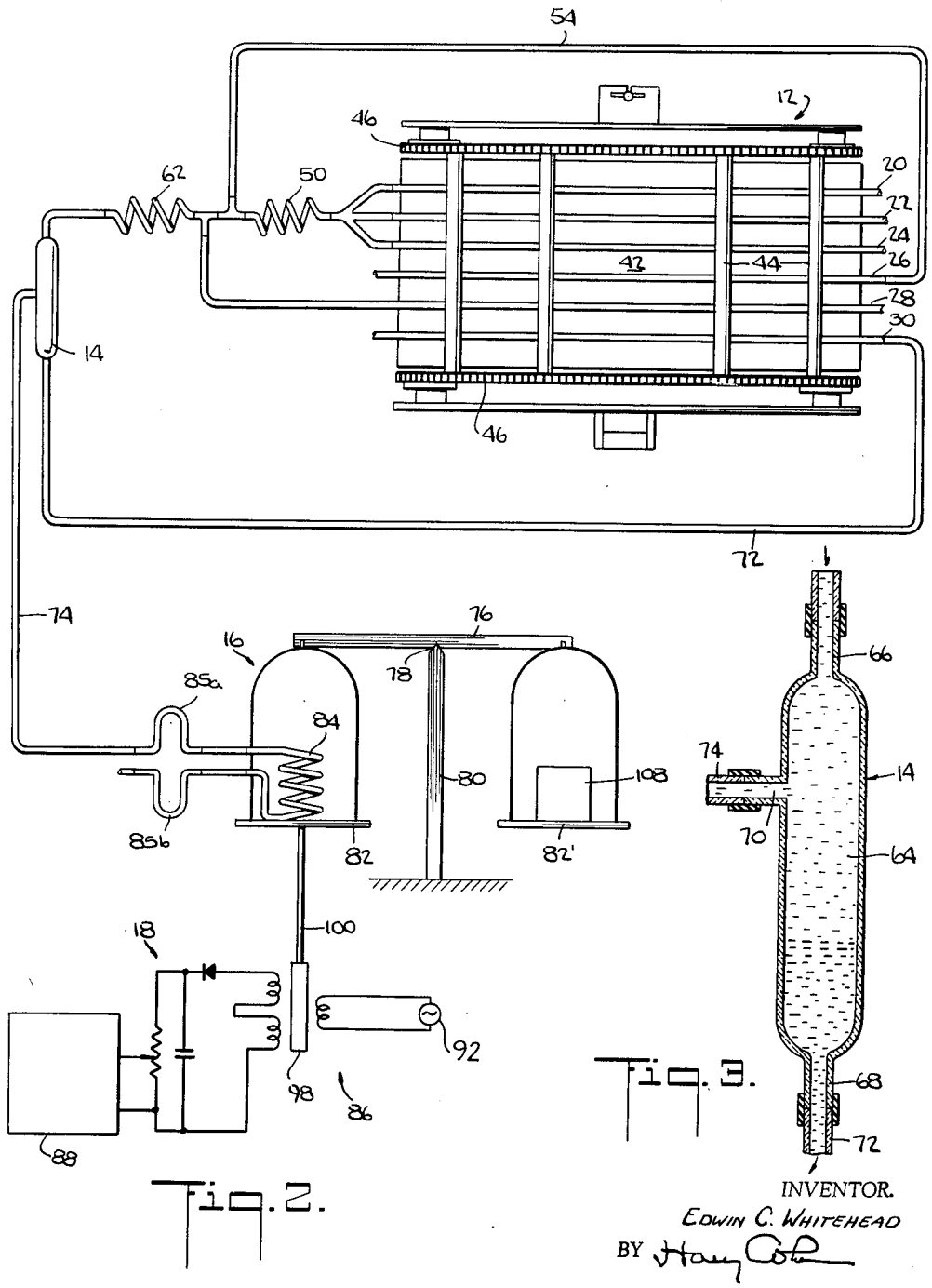

United States Patent Office 3,200,651
Patented Aug. 17, 1965

3,200,651
METHOD AND APPARATUS FOR DETERMINING THE CONCENTRATION BY WEIGHT OF A SUBSTANCE IN A FLUID STREAM
Edwin C. Whitehead, Sloatsburg, N.Y., assignor to Technicon Instruments Corporation, Chauncey, N.Y., a corporation of New York
Filed Nov. 21, 1961, Ser. No. 154,007
22 Claims. (Cl. 73—434)

This invention relates to a method and apparatus for weighing a substance contained in a flowing fluid stream.

One object of the present invention is to provide a method and apparatus for continuously determining the concentration by weight of a substance in a fluid stream.

Another object is to provide a method and apparatus of the above indicated type in which the substance is separated from the fluid stream and is thereafter formed into another stream which is weighed during its flow.

A further object is to provide apparatus of the indicated type with means for continuously recording the weight of the substance in the fluid stream.

The above and other objects, features and advantages of the invention will be more fully understood from the following description of the invention considered in connection with the accompanying drawings which are illustrative of the invention and are not in limitation thereof.

In the drawings:

FIG. 2 is a view similar to FIG. 1 illustrating another form of the invention; and FIG. 3 is a vertical sectional view, on a larger scale, of part of the apparatus of FIGS. 1 and 2.

Figure 1:
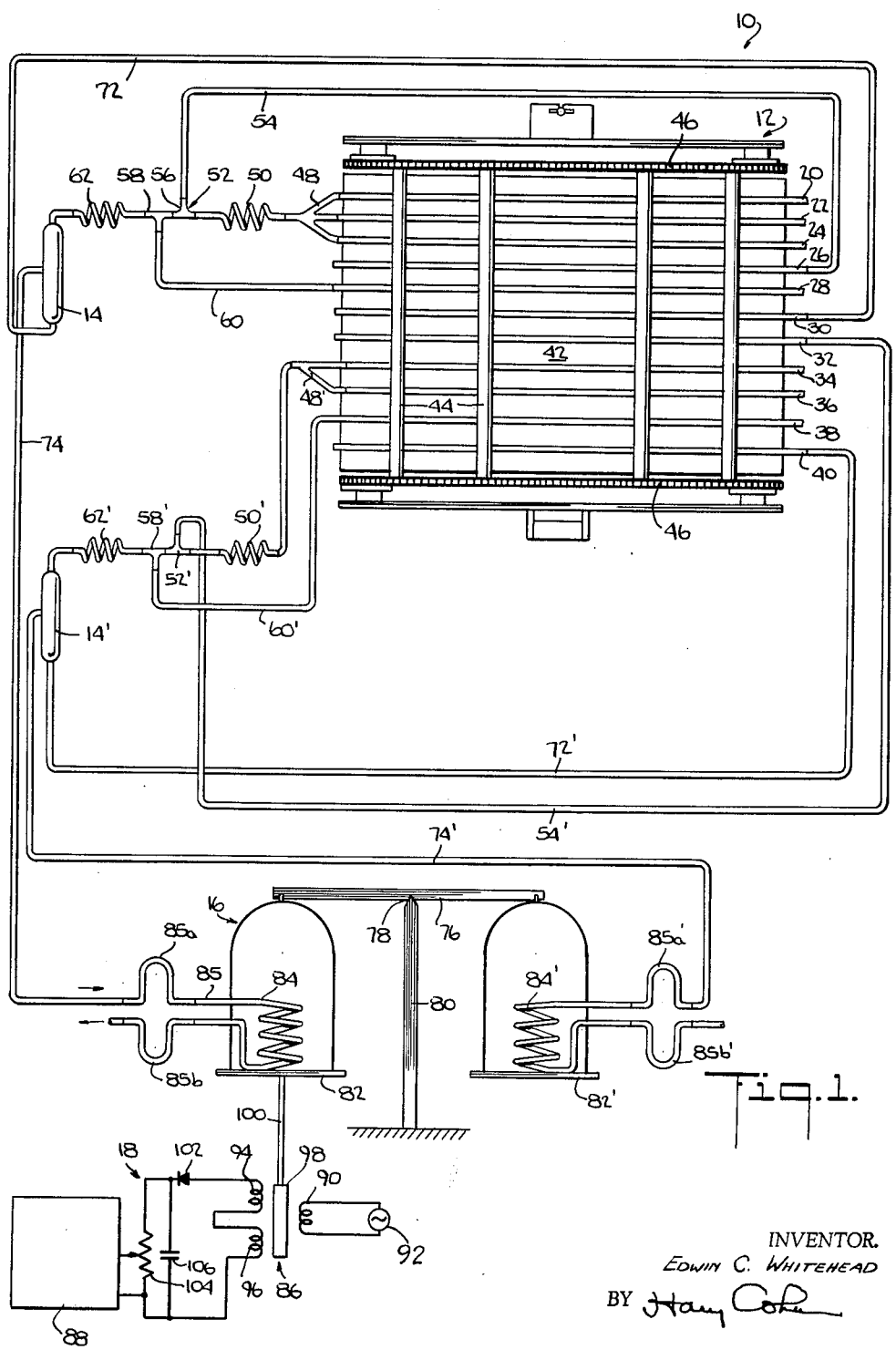
FIG. 1 is a more or less diagrammatic view illustrating the method and apparatus according to the invention.

Referring now to the drawings in detail and especially FIGS. 1 and 3, the apparatus 10 comprises a proportioning pump 12, a separating device 14, a balance 16 and a recorder 18 which is operable in response to movements of the balance for providing a continuous record of the weight of the substance in a fluid stream.

In accordance with the invention, briefly described and as illustrated by FIG. 1, the liquid containing the substance whose weight is to be determined is formed into a stream and is treated during its flow to separate the substance therefrom. The separated substance is transmitted by a carrier liquid to a coil or other length of tubing which is supported at one side of the fulcrum of a balance, the coil of tubing being movable in accordance with the weight of the substance in the carrier liquid. The other side of the balance supports an identical coil of tubing, and a stream containing the carrier liquid only is transmitted to this coil concurrently with and at the same flow rate as the stream containing the carrier liquid and substance in the first mentioned coil. The movement of the first mentioned coil is proportional to the difference between the weights of the fluids in the two coils on the balance and therefore proportional to the weight of the substance in the carrier fluid. The recorder 18 is responsive to the movement of the balance and records the weights of the substance in a continuous fashion.

Referring now more specifically to FIG. 1, pump 12 is preferably of the type shown in U.S. Patent No. 2,935,-028 issued May 3, 1960 and comprises a series of resiliently flexible pump tubes 20, 22, 24, 26, 28 and 30 which are utilized for pumping the sample liquid and other fluids for treatment of the sample liquid. The pump also includes the resiliently flexible pump tubes 32, 34, 36, 38 and 40 which are operated concurrently with the other pump tubes for pumping identical fluids, respectively, except the sample liquid. The pump tubes are compressed along their lengths against a platen 42 by a series of pressure rollers 44 which are moved by sprocket chains 46 longitudinally of the pump tubes. The collapsing of the pump tubes by the longitudinally moving pressure rollers causes the fluids in the pump tubes to flow in the direction of movement of the pressure rollers for the pumping operation and various rates of flow of the fluids can be obtained by varying the internal diameters of the respective pump tubes.

The liquid sample containing the substance whose weight is to be determined is supplied to pump tube 20. Air or other inert gas is supplied to pump tube 22 and, if necessary, a diluent, for example water, is supplied to pump tube 24. The different fluids are transmitted through their respective pump tubes by the action of the pump to a fitting 48 where they join each other to form a segmented stream comprising a series of liquid segments, each containing a portion of the sample and a portion of the diluent, separated from each other by a series of intervening air segments. The segmented stream is transmitted by the action of the pump to a horizontal helical mixing coil 50 where the constituents of each liquid segment are mixed together in the respective segment. The segmented stream is then transmitted from the mixing coil to an inverted T-shaped fitting 52 in which the air segments of the segmented stream are removed. More particularly, a conduit 54 connects pump tube 26 to the upwardly extending leg 56 of the T-fitting and the air segments rise in leg 56 and are aspirated therefrom and escape to the atmosphere via conduit 54 and pump tube 26, respectively.

As explained in U.S. Patent No. 2,797,149 issued June 25, 1957, the segmentation of the liquid sample stream helps keep the internal walls of the tubular passages clean and also reduces contamination of one portion of the sample stream by a preceding portion of the stream.

The consolidated stream containing the sample and the diluent is transmitted to a fitting 58 where it joins a liquid stream containing a suitable solvent for extracting the substance under investigation in the sample stream. The solvent stream is introduced into pump tube 28 and is transmitted to fitting 58 via conduit 60. The liquid streams are mixed together in helical mixing coil 62 and a stream is formed therein containing a mixture of immiscible liquids of different specific gravities which are separated from each other in the separating device or solvent extractor 14. One of the liquids of the mixture contains the solvent and the substance which has been extracted from the liquid sample by the action of the solvent. This liquid is separable from the other liquids of the stream in device 14 because it is immiscible with said other liquids and has a different specific gravity than said other liquids.

As best seen in FIG. 3, the solvent extractor 14 is of tubular construction and comprises a vertical chamber 64 having an inlet opening 66 at its upper end for the liquid mixture from mixing coil 62, an outlet opening 68 at its lower end for the separated heavier liquid of the mixture, and another outlet opening 70 positioned between said inlet and outlet openings for the separated lighter liquid of the mixture. As the stream from mixing coil 62 flows into chamber 64 through opening 66, the heavier phase of the mixture tends to settle toward the bottom of the vertical chamber and the lighter phase of the mixture tends to rise above the heavier phase. Outlet 68 for the heavier liquid phase is connected to pump tube 30 via conduit 72 and the internal diameter of pump tube 30 is selected so that the rate of flow of the separated heavier liquid through outlet 68 is greater than the rate of flow of the heavier liquid portion of the incoming mixture through inlet 66. This results in the flow of all of the heavier liquid plus a small portion of the lighter liquid through outlet 68 and the separated lighter liquid containing the solvent and the substance is transmitted from chamber 64 through outlet 70 and conduit 74 to the balance 16.

The balance 16 comprises a beam 76 supported at the fulcrum 78 provided by the support 80. A pair of identical pans 82 and 82' carry identical coils 84 and 84' of tubing, preferably but not necessarily glass, and the pans with their respective coils of tubing are suspended at the outer ends of beam 76 and are in balanced relation so that the beam is horizontal. The inlet end of coil 84 is connected to conduit 74 so that the solvent containing the extracted substance from the liquid sample is transmitted through the coil 84 concurrently with the flow of the solvent only through coil 84'. The resulting movement of coil 84 and its supporting pan 82 is proportional to the weight of the substance passing through coil 84 and this movement is measured and recorded by recorder 18 so that a continuous record of the weight of the substance in the liquid sample is provided. The inlet end 85 of coil 84 is connected to tubing 74 by a flexible tube 85a so that the connection does not interfere with the operation of the balance. A similar flexible connection 85b is indicated at the outlet end of the coil.

The inlet of coil 84' is connected to fluid passages which are identical to those which are connected to the inlet of coil 84 except no provision is made for introducing liquid sample into the side of the apparatus which is connected to coil 84'. In this manner only solvent is transmitted to 84' whereas solvent plus the substance from the liquid sample is transmitted to coil 84. The flexible tube connections for coil 84' are indicated at 85a' and 85b'. Pump tube 32 is operative to aspirate air from fitting 52', pump tube 34 introduces the segmentizing air, pump tube 36 introduces the diluent, pump tube 38 introduces the solvent and pump tube 40 transmits the separated heavier liquid from the separating device 14'. No pump tube equivalent to pump tube 20 for the liquid sample is required or provided for the side of the apparatus connected to helical coil 84'. In all other respects the two sides of the apparatus are identical and like parts are identified by primed numerals.

In order to maintain the rates of flow of the fluids the same for both sides of the apparatus, pump tube 36 can be provided with a larger internal diameter than corresponding pump tube 24 for introducing additional diluent into the system which will be equal to the quantity of the liquid sample introduced through pump tube 20. If desired or if required, in lieu of providing a larger pump tube for the diluent, an additional pump tube may be provided connected to fitting 48' which will be the same as pump tube 20 but will transmit a diluent in lieu of the sample liquid. In this way those portions of the solvent which are introduced through pump tubes 28 and 38, respectively, will flow through coils 84 and 84' concurrently.

By making both sides of the apparatus similar and by determining the weight of a substance in a liquid sample by comparing the weight of a solvent stream containing the substance with the weight of an identical solvent stream without the substance and by subjecting both solvent streams to identical treatment, the effect of ambient temperature variations which affect solubility and thereby the results of the weight determination is nullified.

The recorder 18 comprises a differential transformer 86 and a millivolt recorder 88. The transformer comprises a primary coil 90 connected to a suitable source 92 of alternating current and two secondary coils 94 and 96 which are connected in series opposition. A movable core 98 is positioned between the primary and secondary coils of the transformer and is connected to pan 82 by a member 100. Movement of the pan 82 causes core 98 to change its position with respect to coils 94 and 96 and, in accordance with said movement, currents are induced in said coils 94 and 96 in response to the position of pans 82. The differential resulting current is rectified by rectifier 102 and flows through resistor 104 causing a voltage drop across said resistor which is transmitted to the recorder 88 which responds in accordance with said voltage to provide a record of the movement of pan 82 which corresponds to the weight of the substance flowing through coil 84. Capacitance 106 bypasses alternating or pulsating current so that such current is isolated from resistor 104.

The apparatus and method of the invention may be utilized to determine the concentration by weight of a substance in a liquid which is separable therefrom by an extracting solvent. An illustrative and non-limitative example of such use is in the determination of the butter fat content of milk. For such determination, a portion of the milk sample is introduced through pump tube 20 and water as the diluent is introduced into pump tube 24. The extracting solvent in the case of butter fat determinations can be ethyl ether or petroleum ether. These solvents extract the butter fat from the milk and the extracted butter fat and solvent are separated from the milk in separating device 14 and are transmitted to coil 84 concurrently with the transmission of the solvent only to coil 84'. As the flow rates are known, the recording indicates the quantity by weight of the butter fat in the milk sample.

Referring now to FIG. 2, there is shown an apparatus and method for determining the concentration by weight of a substance in a liquid which is similar to that shown in FIG. 1 but in lieu of providing a coil 84' for the solvent and the associated fluid treatment passages shown in FIG. 1, a weight 108 is provided on pan 82'. The weight 108 is equal to the sum of the weights of coil 84' and the solvent which flows through said coil. It will be apparent that the movement of pan 82 corresponds to the weight of the substance in the liquid sample. The apparatus of FIG. 2 may be used where there are no changes to solubilities or other characteristics of the fluids due to temperature variations or some other reason.

It is to be observed that initially the balance assumes a position in response to the weight of the substance in the carrier stream and remains in that position as long as the weight of the substance does not change. Subsequent movements of the balance will be in accordance with the changes of the weight of the substance in the carrier stream.

While the invention has been described with respect to a solvent extractor for separating a substance from the sample stream, it will be understood that it is within the scope of the invention to separate the substance from the sample stream by other means, for example by dialysis or filtration. A suitable dialyzer for accomplishing the separation is shown and described in U.S. Patent No. Re. 24,736 issued on November 17, 1959. It will be apparent that when a dialyzer is used, the recipient stream contains the separated substance in the form of the diffusate and is transmitted to the coil 84 of the apparatus of FIG. 1 and the recipient stream without the diffusate is concurrently transmitted to coil 84'.

A suitable filter of the continuous type for separating the substance from the sample stream is shown and described in the U.S. application of Leonard T. Skeggs, Serial No. 36,583 filed June 16, 1960, now Patent No. 3,098,719, which is assigned to the assignee of the present application. It will be apparent that when a filter is used for separation, the filtrate containing the substance is transmitted to coil 84 concurrently with the transmission of filtrate without the substance to coil 84'.

The invention is not limited to the determination of the concentration by weight of a substance in a liquid or gaseous stream but can be used to determine the concentration by weight of a substance which is solid in form and which is part of a mixture of various substances, More particularly, in such a mixture the substance can be separated from the mixture by chemical reaction and the resulting derivative product can be weighed as it flows as part of a stream. For example, in determining the quantity by weight of copper in a mixture of lead and copper, the mixture can be placed in a vessel to which a continuous stream of hot concentrated sulphuric acid is transmitted. Simultaneously, a stream of the reaction product which is water containing copper sulphate is continuously withdrawn from the vessel. The concentration of the resulting copper sulphate in the withdrawn stream of water represents the weight of the copper in the mixture. The weight of the copper sulphate is determined by comparing the weight of the withdrawn stream with the weight of a similar stream containing water only.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying ideas or principles of this invention within the scope of the appended claims.

What is claimed is:

1. Apparatus for continuously determining the concentration by weight of a substance in a liquid, comprising:
   (a) means for continuously transmitting said liquid in the form of a stream,
   (b) separating means in fluid flow communication with said transmitting means for continuously separating said substance from said stream, and
   (c) means in fluid flow communication with said separating means for continuously weighing a stream containing said separated substance during the flow of said last mentioned stream.

2. Apparatus for continuously determining the concentration by weight of a substance in a liquid, comprising:
   (a) means for continuously transmitting said liquid in the form of a stream,
   (b) separating means in fluid flow communication with said transmitting means for continuously separating said substance from said stream, and
   (c) means in fluid flow communication with said separating means for continuously weighing a stream containing said separated substance during the flow of said last mentioned stream,
   (d) said weighing means comprising a coil of tubing mounted for movement in response to the weight of said substance flowing through said coil.

3. Apparatus for continuously determining the concentration by weight of a substance in a liquid, comprising:
   (a) means for continuously transmitting said liquid in the form of a stream,
   (b) separating means in fluid flow communication with said transmitting means for continuously separating said substance from said stream,
   (c) means in fluid flow communication with said separating means for continuously weighing a stream containing said separated substance during the flow of said last mentioned stream,
   (d) said weighing means comprising a coil of tubing mounted for movement in response to the weight of said substance flowing through said coil, and
   (e) means operable under the control of said weighing means for providing a continuous record of the weight of said substance according to the movement of said weighing means.

4. Apparatus for continuously determining the concentration by weight of a substance in a liquid, comprising:
   (a) means for continuously transmitting a stream of liquid containing said first mentioned liquid and a solvent for the substance therein for continuously extracting said substance from said first mentioned liquid and thereby continuously forming a liquid in said stream which contains said solvent and said substance and which is separable from the other liquid of said stream,
   (b) separating means in fluid flow communication with said transmitting means for continuously separating said liquid containing said solvent and said substance from the other liquid of said stream,
   (c) means for continuously weighing a stream of liquid during its flow, and
   (d) means for continuously transmitting a stream of said separated liquid containing said solvent and said substance from said separating means to said continuous weighing means for the weighing of said stream during the flow of said last mentioned stream.

5. Apparatus for continuously determining the concentration by weight of a substance in a liquid comprising:
   (a) means for continuously transmitting a stream of liquid containing said first mentioned liquid and a solvent for the substance therein for continuously extracting said substance from said first mentioned liquid and thereby continuously forming a liquid in said stream which contains said solvent and said substance and which is separable from the other liquid of said stream,
   (b) separating means in fluid flow communication with said transmitting means for continuously separating said liquid containing said solvent and said substance from the other liquid of said stream,
   (c) means for continuously weighing a stream of liquid during its flow, and
   (d) means for continuously transmitting a stream of said separated liquid containing said solvent and said substance from said separating means to said continuous weighing means for the weighing of said stream during the flow of said last mentioned stream,
   (e) said weighing means comprising a coil of tubing mounted for movement in response to the weight of said substance in said separated liquid.

6. Apparatus for continuously determining the concentration by weight of a substance in a liquid, comprising:
   (a) means for continuously transmitting a stream of liquid containing said first mentioned liquid and a solvent for the substance therein for continuously extracting said substance from said first mentioned liquid and thereby continuously forming a liquid in said stream which contains said solvent and said substance and which is immiscible with and has a different specific gravity than the other liquid of said stream,
   (b) separating means in fluid flow communication with said transmitting means for continuously separating said liquid containing said solvent and said substance from the other liquid of said stream,
   (c) said separating means comprising a vertical chamber having an upper inlet for said stream, a lower outlet for the separated heavier liquid of said stream, and another outlet between said lower outlet and said inlet for the separated lighter liquid of said stream,
   (d) means for continuously weighing a stream of liquid during its flow, and
   (e) means connected to one of said outlets of said separating means for continuously transmitting a stream of said separated liquid containing said solvent and said substance from said separating means to said continuous weighing means for the weighing of said stream during the flow of said last mentioned stream.

7. Apparatus for continuously determining the concentration by weight of a substance in a liquid, comprising:
   (a) means for continuously transmitting a stream of liquid containing said first mentioned liquid and a solvent for the substance therein for continuously extracting said substance from said first mentioned liquid and thereby continuously forming a liquid in said stream which contains said solvent and said substance and which is immiscible with and has a different specific gravity than the other liquid of said stream, (b) separating means in fluid flow communication with said transmitting means for continuously separating said liquid containing said solvent and said substance from the other liquid of said stream, (c) said separating means comprising a vertical chamber having an upper inlet for said stream, a lower outlet for the separated heavier liquid of said stream, and another outlet between said lower outlet and said inlet for the separated lighter liquid of said stream, (d) means for continuously weighing a stream of liquid during its flow, and (e) means connected to one of said outlets of said separating means for continuously transmitting a stream of said separated liquid containing said solvent and said substance from said separating means to said continuous weighing means for the weighing of said stream during the flow of said last mentioned stream, (f) said weighing means comprising a coil of tubing mounted for movement in response to the weight of said substance in said separated liquid.

8. Apparatus for continuously determining the concentration by weight of a substance in a liquid, comprising:

(a) means for continuously transmitting a stream of liquid containing said first mentioned liquid and a solvent for the substance therein for continuously extracting said substance from said first mentioned liquid and thereby continuously forming a liquid in said stream which contains said solvent and said substance and which is separable from the other liquid of said stream, (b) separating means in fluid flow communication with said transmitting means for continuously separating said liquid containing said solvent and said substance from the other liquid of said stream, (c) means for continuously weighing a stream of liquid during its flow, (d) means for continuously transmitting a stream of said separated liquid containing said solvent and said substance from said separating means to said continuous weighing means for the weighing of said stream during the flow of said last mentioned stream, (e) said weighing means comprising a coil of tubing mounted for movement in response to the weight of said substance in said separated liquid, and (f) means operable under the control of said weighing means for providing a continuous record of the weight of said substance according to the movement of said weighing means.

9. Apparatus for continuously determining the concentration by weight of a substance in a liquid, comprising:

(a) means for continuously transmitting a stream of liquid containing said first mentioned liquid and a solvent for the substance therein for continuously extracting said substance from said first mentioned liquid and thereby continuously forming a liquid in said stream which contains said solvent and said substance and which is separable from the other liquid of said stream, (b) separating means in fluid flow communication with said transmitting means for continuously separating liquid containing said solvent and said substance from the other liquid of said stream, (c) means for continuously weighing a stream of liquid during its flow comprising a pair of coils of tubing in weight-balanced relationship and movable with respect to each other in response to the difference in the weight of the fluids passing through said coils, respectively, (d) means for continuously transmitting a stream of said separated liquid containing said solvent and said substance from said separating means to one of said coils for the continuous weighing of said stream, and (e) means for continuously transmitting a stream of said solvent only to said other coil for the continuous weighing thereof synchronously with the continuous weighing of said stream of separated liquid so that the amount of movement of said coils with respect to each other is representative of the weight of said substance in said first mentioned liquid.

10. Apparatus for continuously determining the concentration by weight of a substance in a liquid, comprising:

(a) means for continuously transmitting a stream of liquid containing said first mentioned liquid and a solvent for the substance therein for continuously extracting said substance from said first mentioned liquid and thereby continuously forming a liquid in said stream which contains said solvent and said substance and which is separable from the other liquid of said stream, (b) separating means in fluid flow communication with said transmitting means for continuously separating said liquid containing said solvent and said substance from the other liquid of said stream, (c) means for continuously weighing a stream of liquid durings its flow comprising a pair of coils of tubing in weight-balanced relationship and movable with respect to each other in response to the difference in the weight of the fluids passing through said coils, respectively.

(d) means for continuously transmitting a stream of said separated liquid containing said solvent and said substance from said separating means to one of said coils for the continuous weighing of said stream, (e) means for continuously transmitting a stream of said solvent only to said other coil for the continuous weighing thereof synchronously with the continuous weighing of said stream of said separated liquid so that the amount of movement of said coils with respect to each other is representative of the weight of said substance in said first mentioned liquid, and (f) means responsive to said movement for providing a continuous record of the weight of said substance.

11. Apparatus for continuously determining the concentration by weight of a substance in a liquid, comprising:

(a) means for continuously transmitting said liquid in the form of a stream, (b) means in fluid flow communication with said transmitting means for continuously separating said substance from said stream and continuously forming another liquid stream containing said separated substance and a carrier liquid for said substance.

(c) means for continuously weighing a stream of liquid during its flow comprising a pair of coils of tubing in weight-balanced relationship and movable with respect to each other in response to the difference in the weight of the fluids passing through said coils, respectively, (d) means for continuously transmitting said other liquid stream containing said separated substance and said carrier liquid to one of said coils for the continuous weighing of said other stream, and (e) means for continuously transmitting a stream of said carrier liquid only to said other coil for the weighing thereof synchronously with the continuous weighing of said stream of said other liquid so that the amount of movement of said coils with respect to each other is representative of the weight of said substance in said first mentioned liquid.

12. Apparatus for continuously determining the concentration by weight of a substance in a liquid, comprising:
(a) means for continuously transmitting said liquid in the form of a stream
(b) means in fluid flow communication with said transmitting means for continuously separating said substance from said stream and continuously forming another liquid stream containing said separated substance and a carrier liquid for said substance,
(c) means for continuously weighing a stream of liquid during its flow comprising a coil of tubing for said other stream and a weighted member equal in weight to the sum of the weights of said coil and the quantity of said carrier liquid which is equal to the volume of said coil,
(d) said coil of tubing and said weighted member being mounted for movement in response to the weight of said substance flowing through said coil, and
(e) means for continuously transmitting said other stream to said coil for the continuous weighing of said stream during the flow of said last mentioned stream.

13. Apparatus for continuously determining the concentration by weight of a substance in a liquid, comprising:
(a) means for continuously transmitting said liquid in the form of a stream,
(b) means in fluid flow communication with said transmitting means for continuously separating said substance from said stream and continuously forming another liquid stream containing said separated substance and a carrier liquid for said substance,
(c) means for continuously weighing a stream of liquid during its flow comprising a pair of coils of tubing in weight-balanced relationship and movable with respect to each other in response to the difference in the weight of the fluids passing through said coils, respectively,
(d) means for continuously transmitting said other liquid stream containing said separated substance and said carrier liquid to one of said coils for the weighing of said other stream,
(e) means for concurrently transmitting a stream of said carrier liquid only to said other coil for the continuous weighing thereof synchronously with the continuous weighing of said stream of said other liquid so that the amount of movement of said coils with respect to each other is representative of the weight of said substance in said first mentioned liquid, and
(f) means responsive to said movement for providing a continuous record of the weight of said substance.

14. Apparatus for continuously determining the concentration by weight of a substance in a liquid, comprising:
(a) means for continuously transmitting said liquid in the form of a stream,
(b) means in fluid flow communication with said transmitting means for continuously separating said substance from said stream and continuously forming another liquid stream containing said separated substance and a carrier liquid for said substance,
(c) means for continuously weighing a stream of liquid during its flow comprising a coil of tubing for said other stream and a weighted member equal in weight to the sum of the weights of said coil and the quantity of said carrier liquid which is equal to the volume of said coil,
(d) said coil of tubing and said weighted member being mounted for movement in response to changes in the weight of said substance flowing through said coil,
(e) means for continuously transmitting said other stream to said coil for the continuous weighing of said stream during the flow of said last mentioned stream,
(f) means responsive to said movement for providing continuous record of the weight of said substance.

15. A method of continuously determining the concentration by weight of a substance in a liquid, comprising:
(a) forming a stream of said liquid,
(b) separating said substance from said stream during its flow and forming a stream containing said separated substance, and
(c) weighing said last mentioned stream during its flow.

16. A method of continuously determining the concentration by weight of a substance in a liquid, comprising:
(a) forming a stream of said liquid,
(b) separating said substance from said stream during its flow and forming a stream containing said separated substance,
(c) weighing said last mentioned stream during its flow, and
(d) continuously recording the weight of said stream concurrently with the flow thereof.

17. A method of continuously determining the concentration by weight of a substance in a liquid, comprising:
(a) forming a stream of said liquid,
(b) introducing a stream of a solvent into said liquid stream for extracting said substance from said liquid stream and thereby forming a liquid containing said solvent and said substance and which is separable from the other liquid of said liquid stream,
(c) separating said liquid containing said solvent and said substance from said other liquid during the flow of said liquid stream and forming a stream of said separated liquid, and
(d) weighing said separated liquid during its flow.

18. A method of continuously determining the concentration by weight of a substance in a liquid, comprising:
(a) forming a stream of said liquid,
(b) introducing a stream of a solvent into said liquid stream for extracting said substance from said liquid stream and thereby forming a liquid containing said solvent and said substance and which is separable from the other liquid of said liquid stream,
(c) separating said liquid containing said solvent and said substance from said other liquid during the flow of said liquid stream and forming a stream of said separated liquid, and
(d) weighing said separated liquid during its flow by comparing the weight of said separated liquid stream with the weight of a similar stream which contains solvent only.

19. A method of continuously determining the concentration by weight of a substance in a liquid, comprising:
(a) forming a stream of said liquid,
(b) introducing a stream of a solvent into said liquid stream for extracting said substance from said liquid stream and thereby forming a liquid containing said solvent and said substance and which is separable from the other liquid of said liquid stream,
(c) separating said liquid containing said solvent and said substance from said other liquid during the flow of said liquid stream and forming a stream of said separated liquid, and
(d) weighing said separated liquid during its flow by comparing the weight of said separated liquid stream with the weight of a member whose weight is equal to the weight of a similar stream which contains solvent only.

20. A method of continuously determining the concentration by weight of a substance in a liquid comprising:
(a) forming a stream of said liquid,
(b) introducing a stream of a solvent into said liquid stream for extracting said substance from said liquid stream and thereby forming a liquid containing said solvent and said substance and which is seperable from the other liquid of said liquid stream, (c) separating said liquid containing said solvent and said substance from said other liquid during the flow of said liquid stream and forming a stream of said separated liquid, (d) weighing said separated liquid during its flow, and (e) continuously recording the weight of said separated stream concurrently with the flow thereof.

21. Apparatus for continuously determining the concentration by weight of a substance which is separable from a mixture of said substance and other substances, said apparatus comprising:

(a) means for containing said mixture, (b) means connected to said containing means for separating said substance from said mixture and concurrently forming a fluid stream containing said separated substance, and (c) means for weighing said fluid stream during its flow.

22. Apparatus for continuously determining the concentration by weight of a substance which is separable from a mixture of said substance and other substances, said apparatus comprising: means for containing said mixture; means coupled to said containing means for continuously separating said substance from said mixture and continuously forming a fluid stream containing a derivative product of said separated substance; and means for continuously weighting said fluid stream during its flow.

References Cited by the Examiner

UNITED STATES PATENTS

| | | | |
|---|---|---|---|
| 2,321,175 | 6/43 | Binckley | 73—434 |
| 2,664,011 | 12/53 | Boonshaft | 73—452 |
| 2,708,360 | 5/55 | Geer et al. | 73—434 |
| 2,879,141 | 3/59 | Skeggs. | |

RICHARD C. QUEISSER, *Primary Examiner.*

DAVID SCHONBERG, *Examiner.*